May 12, 1970 A. J. AYLING 3,511,385

FRAMES FOR ACCOMMODATING CIRCUIT CARDS OR MODULE FRAMES

Filed June 11, 1968 5 Sheets-Sheet 1

Anthony John Ayling Inventor

By Watson, Cole, Grindle & Watson Attorneys

FRAMES FOR ACCOMMODATING CIRCUIT CARDS OR MODULE FRAMES

Filed June 11, 1968 5 Sheets-Sheet 2

Inventor
Anthony John Ayling
BY Watson, Cole, Grindle & Watson
Attorneys

May 12, 1970 A. J. AYLING 3,511,385

FRAMES FOR ACCOMMODATING CIRCUIT CARDS OR MODULE FRAMES

Filed June 11, 1968 5 Sheets-Sheet 3

Inventor
Anthony John Ayling
BY Watson, Cole, Grindle & Watson
Attorneys

Inventor
Anthony John Ayling
BY Watson, Cole, Grindle & Watson
Attorneys

Inventor
Anthony John Ayling
BY Watson, Cole, Grindle & Watson
Attorneys

United States Patent Office 3,511,385
Patented May 12, 1970

3,511,385
FRAMES FOR ACCOMMODATING CIRCUIT CARDS OR MODULE FRAMES

Anthony John Ayling, Colden Common, England, assignor to Vero Electronics Limited, Southampton, Hampshire, England, a British company Filed June 11, 1968, Ser. No. 736,216
Int. Cl. A47g *19/08;* H05k *1/00*
U.S. Cl. 211—41 10 Claims

ABSTRACT OF THE DISCLOSURE

A rack for accommodating circuit cards or module frames comprising end plates, two pairs of longitudinal members joining the end plates and rack plates formed with opposed grooves for the reception of the cards or frames, the rack plates and longitudinal members having cooperating tongues and grooves providing sliding engagement between them.

This invention relates to racks for accommodating circuit cards or module frames of the kind comprising end plates, joined by two pairs of longitudinal members, and rack plates, which extend between the longitudinal members and are formed with opposed grooves for the accommodation of the edges of circuit cards or rails provided on module frames. The object of the invention is to facilitate the assembly of such frames.

According to the invention the rack plates and the longitudinal members are formed with cooperating tongues and grooves which enable the rack plates to be slid into engagement with the longitudinal members, after attachment of the latter to one of the end plates. All that is necessary thereafter is to attach the other end plate to the longitudinal members. The rack plates are then retained in position without the necessity of any other attachment to the longitudinal members.

According to a feature of the invention, an identification label or labels may be fitted into a groove in a longitudinal member at the front of the rack to identify the individual pairs of opposed grooves in the rack plates.

Certain embodiments of card rack according to the invention will now be described in more detail with reference to the accompanying drawings, in which.

Figure 6:
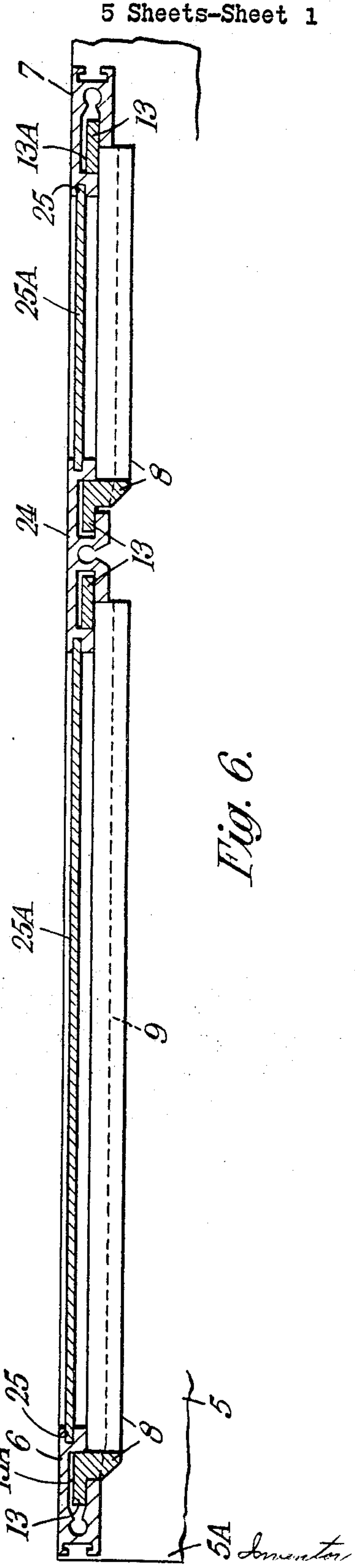
Figure 2:
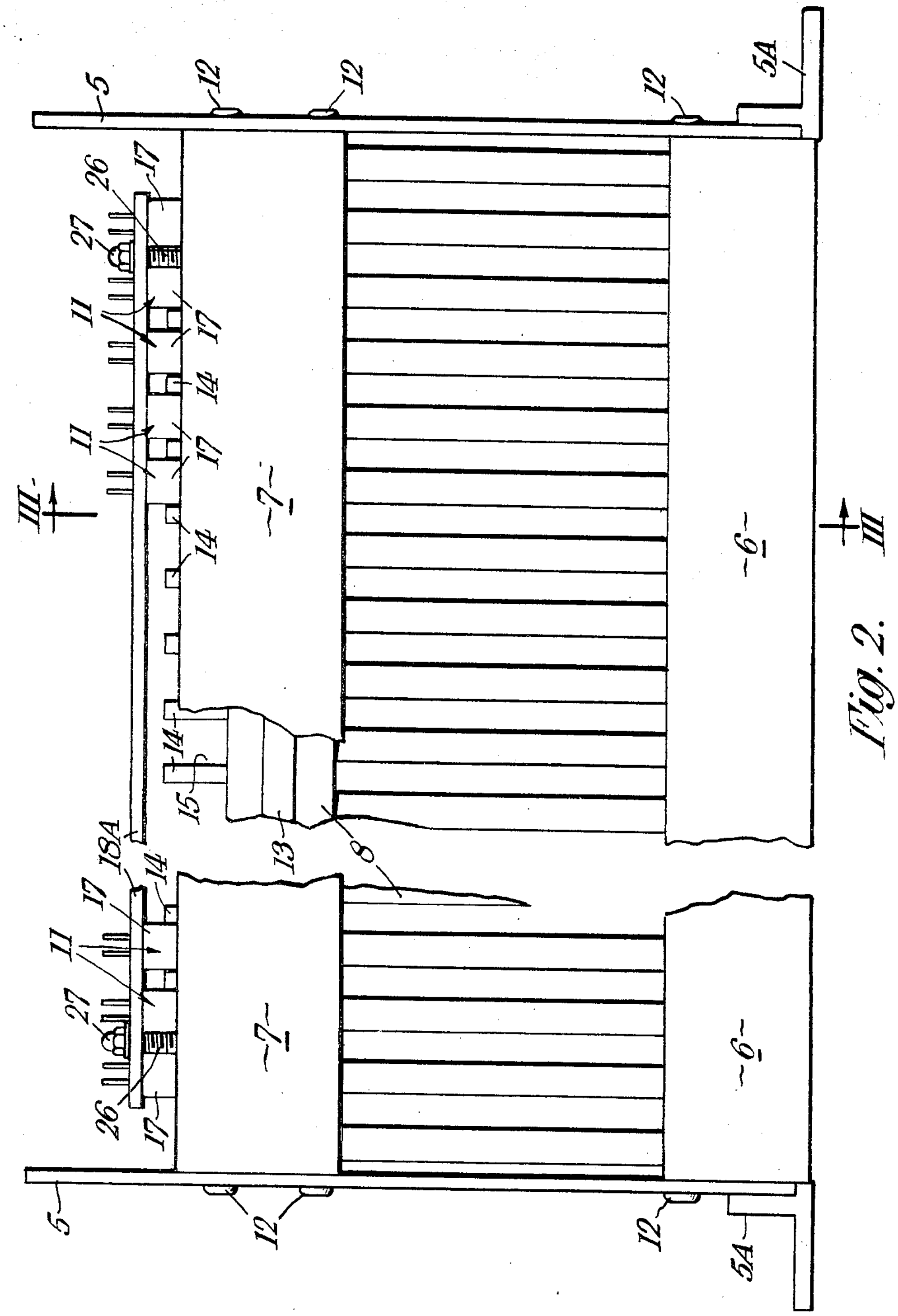
FIG. 2 is a corresponding plan view.
Figure 3:
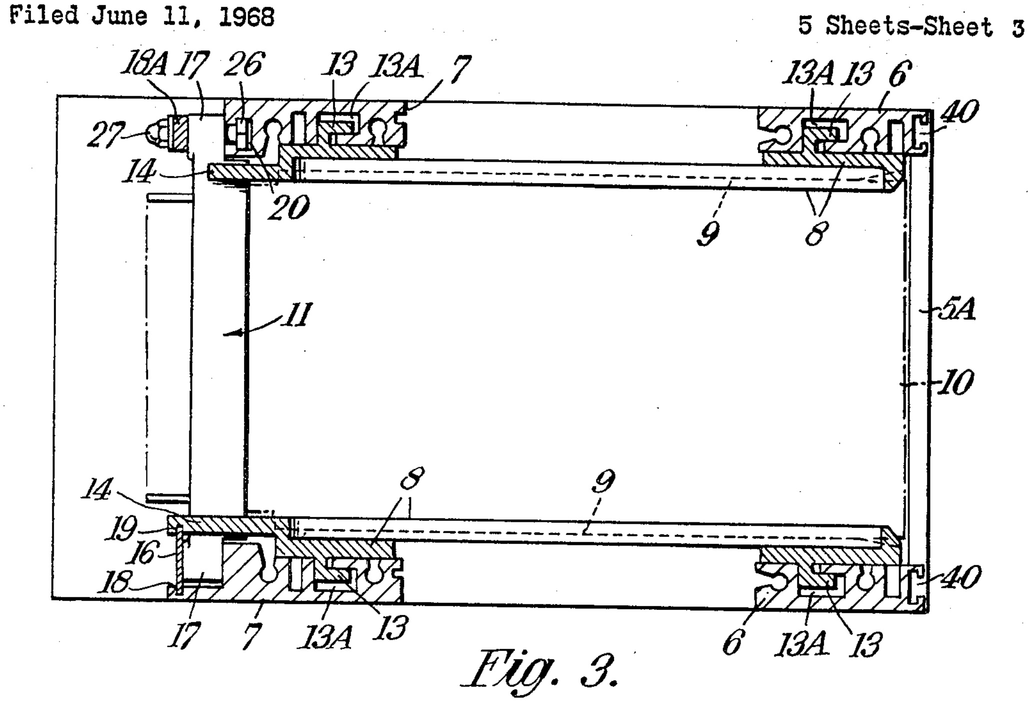
Figure 4:
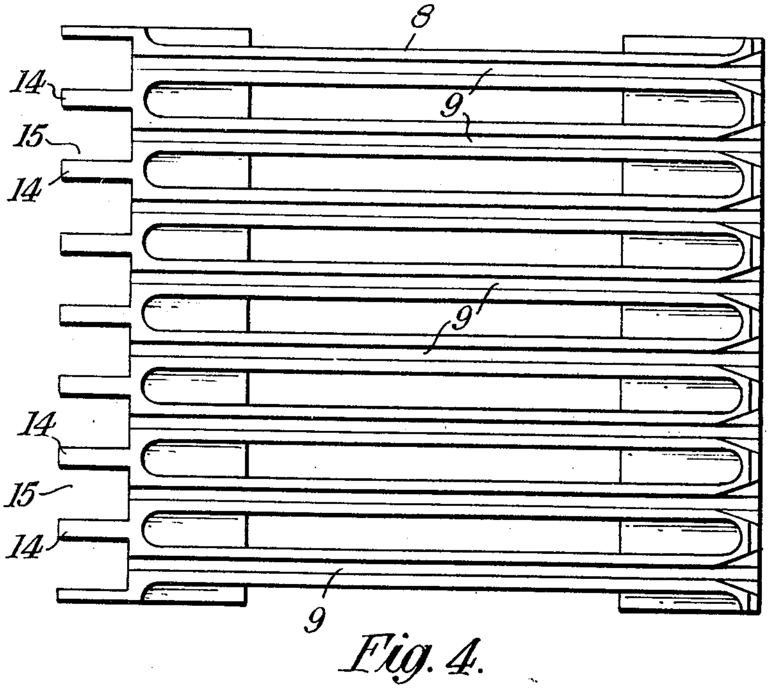
Figure 4A:
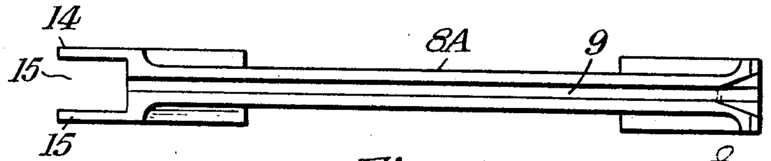
Figure 5:
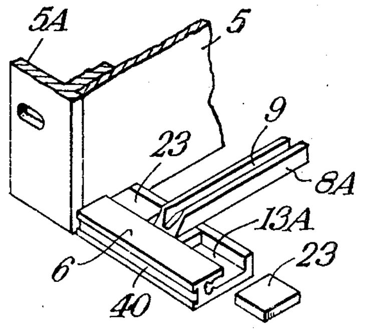
Figure 8:
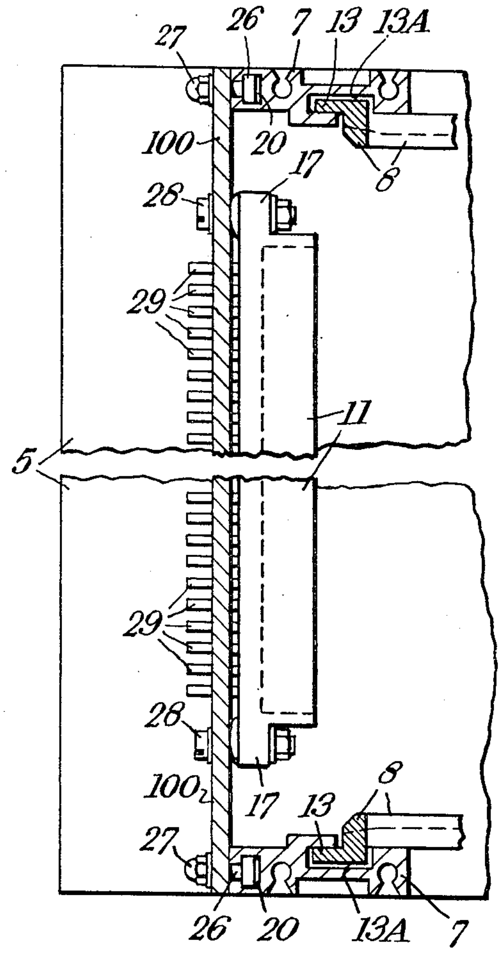
Figure 7:
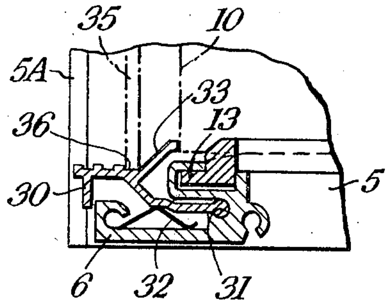
Figure 9:
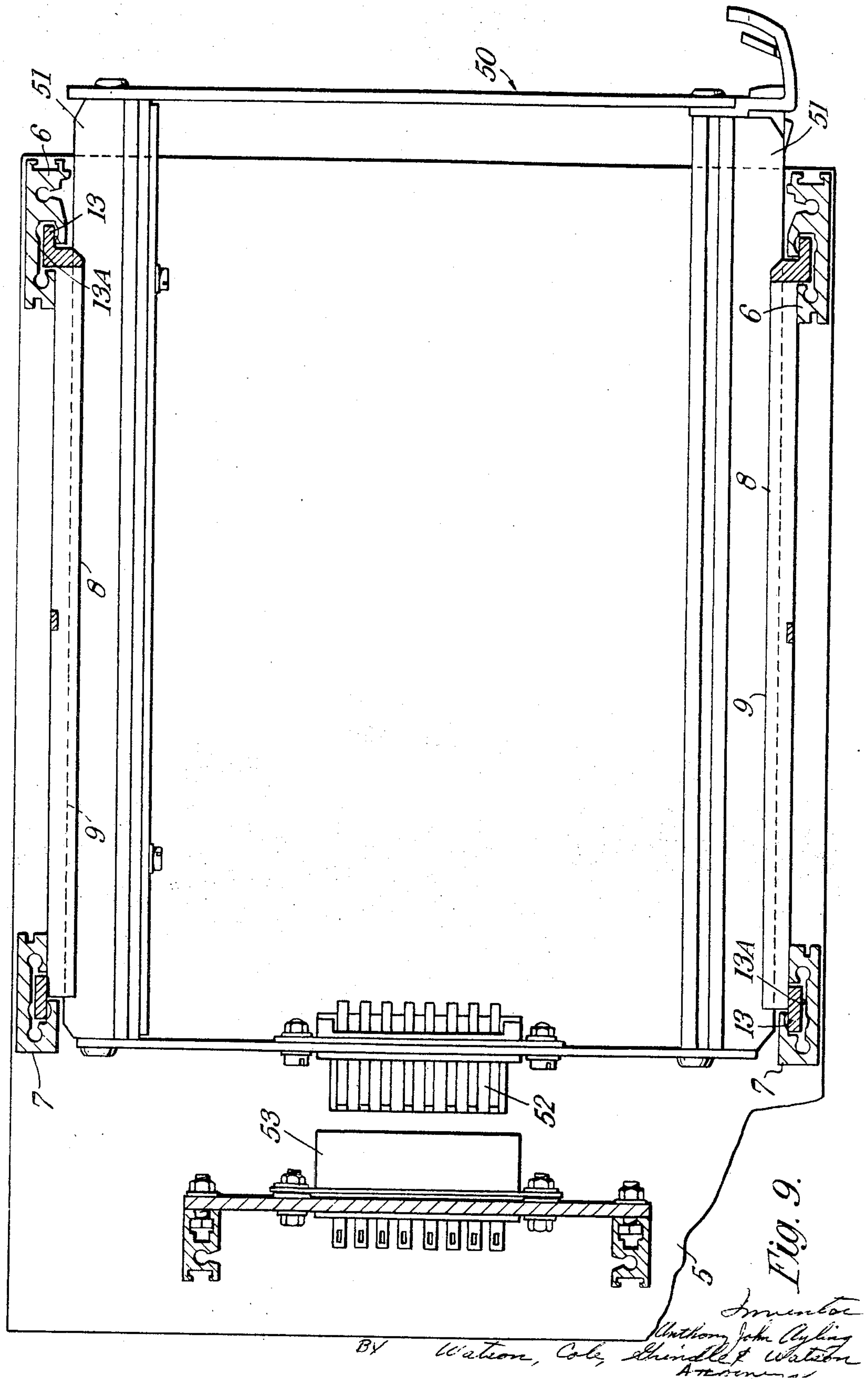

FIG. 3 is a section on the line III—III in FIG. 2, showing at top and bottom two different ways of retaining the edge connectors, FIG. 4 is a side elevation of one of the rack plates, FIG. 4A is a side elevation of an alternative form of rack plate, FIG. 5 is a detail view illustrating how spacers can be fitted between rack plates of the kind shown in FIG. 4A, FIG. 6 is a detail view showing a further modification, FIG. 7 is a detail view illustrating a further modification, FIG. 8 is a sectional view illustrating another way of retaining the edge connectors, and FIG. 9 is a view similar to FIG. 3 showing a rack incorporating a module unit.

Like reference numerals indicate like parts throughout the figures.

The rack shown in FIGS. 1–4 embodies two end plates 5 having mounting brackets 5A, front and rear pairs of aluminium extrusions 6 and 7 and two rack plates 8 moulded from plastic material and formed with numerous apertures to assist in cooling circuit cards installed in the rack. The rack plates 8 are formed with opposed grooves 9 (FIG. 3) for accommodating the edges of circuit cards 10 which can then be slid from the front into the grooves into engagement with recesses (not shown) in edge connectors 11 mounted in the rack. Alternatively, and as later explained with reference to FIG. 9, module frames can be slid into the grooves 9 and in this case edge connectors or pin type plugs and sockets are used to connect the rear of the module to the rack.

The assembly of the members 5, 6, 7 and 8 can be rapidly effected by first attaching the members 6 and 7 to one of the end plates 5 by screws indicated at 12. The rack plates 8 have tongues 13 near top and bottom which can then be slid into engagement with corresponding grooves 13A in the members 6 and 7 as shown in FIG. 3. After this has been done the other end plate 5 is screwed to the members 6 and 7 to retain the rack plates 8 in position. A similar mode of installation is adopted in the case of a module rack, but in this case the plate 8 need not have the projections described below for securing edge connectors in position.

It is not essential for the rack plates 8 to extend for the full length of the frame as illustrated in FIGS. 1–4. They may be replaced by a series of shorter members mounted side by side between the end plates and each adapted to receive a single card or a smaller number of cards. In this case they may abut or they may be spaced apart by spacers to provide space for accommodation of circuit cards carrying sizeable pieces of equipment. Thus, FIG. 4A shows a rack plate 8A having a single pair of grooves 9, and FIG. 5 shows how narrow rack plates 8A may be spaced apart by spacers 23 inserted in the slots 13A in the members 6 and 7.

FIG. 6 illustrates a construction of greater depth from front to rear which includes a pair of central longitudinal members 24 attached to the end plates 5 so as to permit of the fitting of two rows of rack plates 8 extending end to end.

When it is required to cover the top and bottom of a frame, either to prevent the entry of dust, or to provide an electrical screen or to provide a decorative appearance, it is possible to provide additional longitudinal grooves 25 (FIG. 6) in the longitudinal members 6, 7 and 24, so that cover plates 25A can be slid between them and retained by the end plates 5.

It is sometimes desired that a circuit card 10 should carry at its forward end a panel 35 (FIG. 7) extending at right angles to the plane of the card and serving to carry electrical equipment. In the construction shown in FIG. 7 the front longitudinal members 6 are not only grooved to accommodate the projections 13 on the rack plates 8 as previously described but also carrry additional rigid members 30, which fit into cooperating grooves 31 in the members 6 in such a way that the longitudinal members 30 can pivot with respect to the grooves 31, each member 30 being biased by a spring 52 to the position shown in FIG. 7, in which a projection 33 on the member 30 abuts against the front of a circuit card 10, thus ensuring that the card cannot be removed from the rack until the member 30 has been depressed.

When the circuit card carries a front panel 35, the panel can be made of such a length that it is retained by a recess 36 in the member 30 and is released in a similar manner.

The drawings show three different ways of retaining the edge connectors 11 in the rack.

In the arrangement shown at the bottom of FIG. 3 the rack plates 8 are provided at the rear end with flexible projections 14 defining recesses 15 accommodating the ears 17 of the edge connectors 11. The edge connectors are assembled very simply by inserting their ears 17 into the recesses 15 and then retaining them in position by retaining strips 16. This is accomplished by engaging the outer edge of each strip 16 in a groove 18 in the member 7 and then depressing it, the projection 14 deflecting and then springing back to retain the other edge of the strip 16 in a recess 19 in the projection 14.

In the alternative construction shown at the top of FIG. 3 the projections 14 on the rack plates 8 are shorter but the ears 17 are again accommodated in recesses between the projections 14. The strip 16 is replaced by a rigid bar 18A held in position by two or more screws 26 having hexagonal heads located in a slot 20 in the member 7 and each held in place by a nut 27.

In the construction shown in FIG. 8 the ears 17 of the edge connectors 11 are attached by screws 28 to a plate 100 which covers the whole of the rear of the rack and is attached to the members 7 by screws 26 and nuts 27 similar to those at the right hand side of FIG. 3. The plate 100 has holes to accommodate the terminations 29 of the edge connectors and may be of metal or plastics material. It may also carry a printed circuit interconnecting the terminations 29.

Figure 1:
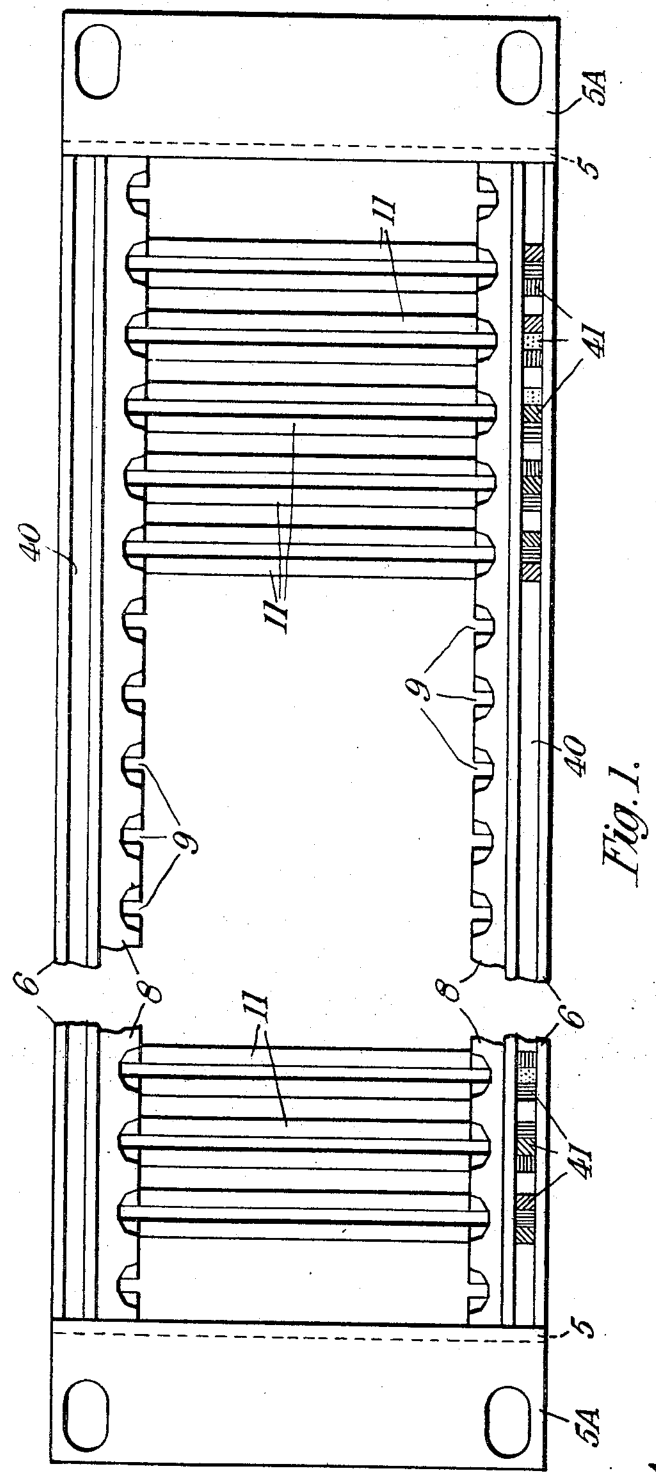
FIG. 1 is a front elevation of a card rack.

As shown in FIGS. 1 and 3 the longitudinal members 6 have grooves 40 in their front faces into which can be slid an identification label 41. This can be in the form of a label extending the full length of the member 6 bearing printed identifying numerals or letters which are spaced to coincide with the spacing of the grooves 9 in the rack plates 8. Alternatively small sections of differently coloured labels 41 can be inserted into the groove 40 and positioned opposite the circuit card grooves 9.

In order to facilitate the wiring to the edge connectors 11, the rearward facing surface of retaining strip 16 (left hand side of FIG. 3) or the rearward facing surface of the rigid retaining bar 13 (right hand side of FIG. 3) can be printed with numerals or letters or colours corresponding to those on the labels 41 fitted to the front of the longitudinal members 6.

FIG. 9 shows how a module unit 50 can be accommodated in a rack according to the invention. The module unit is in the form of a drawer carrying electrical equipment and provided with angle section rails 51 at its corners which are slid into opposed pairs of grooves 9 in the rack plates 8. The drawer carries at its inner end plug type connectors 52 which cooperate with a socket-type connector 53 mounted on the rack.

What I claim as my invention and desire to secure by Letters Patent is:

1. A rack for mounting circuit boards comprising:
   - a pair of spaced end plates,
   - a first pair of vertically spaced longitudinal members attached to said end plates,
   - a second pair of vertically spaced longitudinal members attached to said end plates and extending parallel to said first pair of members,
   - said first and second pair of members each having grooves in their inwardly facing surfaces,
   - rack members extending between each of said pairs of vertically spaced longitudinal members and including projecting tongues which slidably engage said grooves,
   - said rack members including opposed grooves for the reception of circuit card edges, and
   - means for retaining said rack members in parallel spaced relation to each other to accommodate variable sized circuit cards.

2. A rack as claimed in claim 1, in which the rack members are each integral and extend for the full distance between the end plates.

3. A rack as claimed in claim 1, in which each of the rack members is constituted by a plurality of grooved members mounted side by side between the end plates in spaced relationship.

4. A rack as claimed in claim 1 further comprising spacer elements for spacing said plurality of grooved members.

5. A rack as claimed in claim 1 wherein each of the opposed longitudinal members includes a slot for receiving a cover plate.

6. A rack as claimed in claim 1, in which two laterally opposed longitudinal members include hinged members biased by springs to retain circuit cards.

7. A rack as claimed in claim 1 further comprising edge connectors extending between the rack members for forming electrical connections to said circuit cards.

8. A rack as claimed in claim 7 wherein said means for retaining include strips engaging opposed grooves in the rack members and in the longitudinal members for retaining said edge connectors.

9. A rack as claimed in claim 7 wherein said means for retaining include bars attached by screws to the longitudinal members for retaining said edge connectors.

10. A rack as claimed in claim 7 wherein said means for retaining include a plate attached to the longitudinal members for retaining said edge connectors.

References Cited

UNITED STATES PATENTS

| | | | |
|---|---|---|---|
| 3,184,069 | 5/1964 | Rosenberg | 211—41 |
| 3,197,731 | 7/1965 | Beale et al. | 211—41 |
| 3,288,301 | 11/1966 | Kent et al. | 211—41 |
| 3,320,483 | 5/1967 | Pohl | 211—41 |

JAMES A. LEPPINK, Primary Examiner

U.S. Cl. X.R.

339—17